United States Patent
Ravindran et al.

(10) Patent No.: US 9,712,240 B2
(45) Date of Patent: Jul. 18, 2017

(54) MAPPING INFORMATION CENTRIC NETWORKING FLOWS TO OPTICAL FLOWS

(71) Applicant: Futurewei Technologies, Inc., Plano, TX (US)

(72) Inventors: Ravishankar Ravindran, San Ramon, CA (US); Guo-Qiang Wang, Santa Clara, CA (US); Xinwen Zhang, San Ramon, CA (US)

(73) Assignee: Futurewei Technologies, Inc., Plano, TX (US)

( * ) Notice: Subject to any disclaimer, the term of this patent is extended or adjusted under 35 U.S.C. 154(b) by 452 days.

(21) Appl. No.: 14/188,043

(22) Filed: Feb. 24, 2014

(65) Prior Publication Data

US 2015/0244463 A1    Aug. 27, 2015

(51) Int. Cl.
  *H04L 12/28*    (2006.01)
  *H04B 10/27*    (2013.01)
  *H04J 14/02*    (2006.01)
  *H04L 12/715*   (2013.01)
  *H04L 12/723*   (2013.01)

(52) U.S. Cl.
  CPC .......... *H04B 10/27* (2013.01); *H04J 14/0258* (2013.01); *H04L 45/50* (2013.01); *H04L 45/64* (2013.01)

(58) Field of Classification Search
  CPC ..................................................... H04B 10/27
  USPC ........................................................... 398/58
  See application file for complete search history.

(56) References Cited

U.S. PATENT DOCUMENTS

| | | | |
|---|---|---|---|
| 8,593,968 B2 | 11/2013 | Santiago et al. | |
| 8,863,227 B2* | 10/2014 | Zhang | G06F 21/10 713/171 |
| 8,867,915 B1* | 10/2014 | Vahdat | H04B 10/27 398/55 |
| 8,918,835 B2* | 12/2014 | Ravindran | H04L 63/104 726/1 |
| 2002/0109879 A1* | 8/2002 | Wing So | H04J 7/00 398/58 |

(Continued)

FOREIGN PATENT DOCUMENTS

WO    2013126339 A1    8/2013
WO    2013159683 A1    10/2013

(Continued)

OTHER PUBLICATIONS

Foreign Communication From a Counterpart Application, PCT Application No. PCT/CN2015/073246, English Translation of International Search Report dated Jun. 5, 2015, 7 pages.

(Continued)

*Primary Examiner* — Khaled Kassim
*Assistant Examiner* — Berhanu Belete
(74) *Attorney, Agent, or Firm* — Conley Rose, P.C.

(57) ABSTRACT

A method implemented by an edge node in an optical network, the method comprising receiving one or more information centric networking (ICN) service flows, each of which is identifiable by a service label, determining at least one optical resource to be provisioned to the one or more service flows based on the one or more service labels, converting the one or more ICN service flows to one or more optical flows, and transmitting the one or more optical flows using the at least one optical resource.

23 Claims, 13 Drawing Sheets

(56) References Cited

U.S. PATENT DOCUMENTS

| | | | |
|---|---|---|---|
| 2003/0120817 A1* | 6/2003 | Ott | H04L 12/1859 709/249 |
| 2005/0030951 A1* | 2/2005 | Maciocco | H04Q 11/0066 370/395.2 |
| 2005/0089327 A1* | 4/2005 | Ovadia | H04L 45/04 398/47 |
| 2005/0105905 A1* | 5/2005 | Ovadia | H04L 12/5695 398/47 |
| 2009/0285209 A1* | 11/2009 | Stewart | H04L 65/1069 370/389 |
| 2009/0287835 A1* | 11/2009 | Jacobson | H04L 67/104 709/229 |
| 2012/0033968 A1* | 2/2012 | Testa | H04J 14/0204 398/47 |
| 2012/0159176 A1* | 6/2012 | Ravindran | H04L 63/104 713/176 |
| 2012/0166806 A1* | 6/2012 | Zhang | H04L 9/3247 713/176 |
| 2012/0174181 A1* | 7/2012 | Zhang | G06F 21/10 726/1 |
| 2012/0204224 A1 | 8/2012 | Wang et al. | |
| 2012/0297088 A1* | 11/2012 | Wang | H04L 63/0272 709/238 |
| 2012/0317307 A1* | 12/2012 | Ravindran | H04L 12/6418 709/238 |
| 2013/0282920 A1* | 10/2013 | Zhang | H04L 45/74 709/238 |
| 2013/0336323 A1 | 12/2013 | Srinivasan | |
| 2014/0164584 A1* | 6/2014 | Joe | H04L 12/5689 709/223 |
| 2014/0189793 A1* | 7/2014 | Kim | H04L 67/06 726/3 |
| 2014/0308040 A1* | 10/2014 | Sekiya | H04J 14/0269 398/79 |

FOREIGN PATENT DOCUMENTS

| | | | | |
|---|---|---|---|---|
| WO | | 2013184941 A1 | 12/2013 | |
| WO | WO | 2013184941 A1 * | 12/2013 | ......... H04L 67/2823 |

OTHER PUBLICATIONS

Foreign Communication From a Counterpart Application, PCT Application No. PCT/CN2015/073246, English Translation of Written Opinion dated Jun. 5, 2015, 4 pages.

\* cited by examiner

MAPPING INFORMATION CENTRIC NETWORKING FLOWS TO OPTICAL FLOWS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Information Centric Networking (ICN) is a network model or architecture in which the focus is on locating and providing information to users rather than on connecting end hosts that exchange data. For example, in ICN-based communication, application requests may bind to the network layer over named entities (e.g., content object, user device, service) and de-couple its location and address information, which may eliminate the need for pre-binding. For another example, name-based routing with in-network caching may allow mobility to be handled in an efficient and flexible manner. For yet another example, security credentials appended to the ICN packet may allow location independence of data and/or service, thereby helping to realize agile information dissemination.

ICN services may be provided by a service provider or producer and consumed by a service user or subscriber. The service consumers and providers may be located in ICN networks, which may be overlaid on an optical network. The optical network may serve as a core network that provides a basic transporting architecture for service flows between service consumers and service producers. In order to facilitate communication, ICN service flows in the ICN networks or domains need to be mapped to optical flows, which may traverse the optical network using various types of optical resources.

SUMMARY

In one embodiment, the disclosure includes a method implemented by an edge node in an optical network, the method comprising receiving one or more information centric networking (ICN) service flows, each of which is identifiable by a service label, determining at least one optical resource to be provisioned to the one or more service flows based on the one or more service labels, converting the one or more ICN service flows to one or more optical flows, and transmitting the one or more optical flows using the at least one optical resource.

In another embodiment, the disclosure includes a network device that functions as an edge node interconnecting an optical network and an ICN, the network device comprising at least one receiver configured to receive one or more service flows from an ICN application, a processor coupled to the at least one receiver and configured to determine at least one optical resource to be provisioned to the one or more service flows based on service requirements specified by the one or more service flows, and convert the one or more service flows to one or more optical flows, and at least one transmitter coupled to the processor and configured to transmit the one or more optical flows using the at least one optical resource.

In yet another embodiment, the disclosure includes a computer program product comprising computer executable instructions stored on a non-transitory computer readable medium such that when executed by a processor cause an edge node to determine a mapping between one or more service labels and at least one optical information label (OIL), wherein a service label in the one or more service labels identifies an ICN service flow, wherein an OIL in the at least one OIL describes a mapping between a set of consumers and producers of one or more services in an ICN plane and resources in an optical plane, allocate a number of optical resources to the at least one OIL adaptively based on one or more service requirements set by the one or more service labels, convert one or more ICN service flows identified by the one or more service labels to at least one optical flow based on the determined mapping between the one or more service labels and the at least one OIL, and send the at least one optical flow onto at least one optical channel using the optical resources allocated to the at least one OIL.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

This disclosure teaches mapping of information centric networking (ICN) service flows to optical flows, which may enable reconfiguration of optical resources adaptively based on service requirements set by the ICN service flows. In an edge node that functions as an interface between an optical network and an ICN overlaid on the optical network, a forwarding information base (FIB) may comprise optical information labels (OILs) which are designed to interconnect the consumer and producer ends of a service. Optical resources, such as bandwidth, wavelength, power, sub-wavelength, packet slots, burst slots, burst headers, etc., may be provisioned or allocated to OILs, which may be known in the optical network. Accordingly, when processing service flows such as a service interest or returned data, optical resources may be reconfigured or re-allocated adaptively based on information contained in the service flows. Reconfigurable optical resources may correspond to point-to-multipoint, point-to-point, or multi-point-to-multi-point resources configured to handle one or more ICN services. During operation of an edge node, multiplexing may comprise mapping ICN service flows to optical flows, while demultiplexing may comprise mapping optical flows to ICN services. Mapping between the ICN services and optical flows may be managed dynamically, e.g., based on service requirements. A control plane may be designed at the edge node to manage the mappings, in order to realize location independent multicast between a service consumer and producer. Further, generalized multi-protocol label switching (GMPLS) may be used to accommodate the service labels. Note that a plurality of ICN service flows may share the same OIL and use the same optical resource(s). On the other hand, one ICN service flow comprising a service interest may correspond to a plurality of OILs and be multicast to a plurality of service providers. Overall, disclosed embodiments may help optimize usage of optical resources in an ICN-overlaid optical network, while meeting ICN service requirements.

Figure 1:
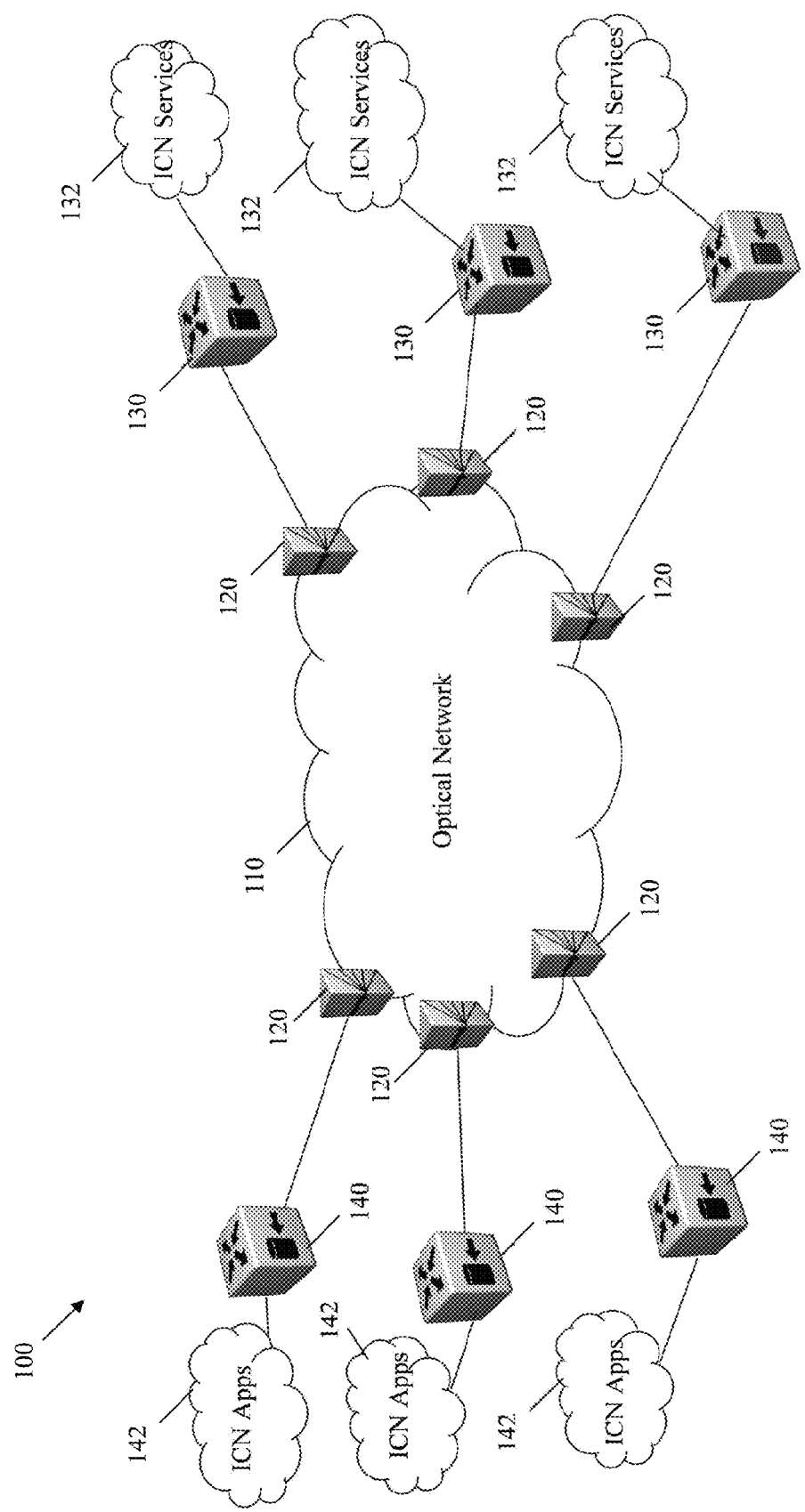
FIG. 1 illustrates an embodiment of a network architecture.

FIG. 1 illustrates an embodiment of a network architecture 100, in which disclosed mapping schemes may operate. The architecture 100 may comprise an optical network 110 serving as a core network. A plurality of edge nodes 120 may be deployed in the optical network 110 to interconnect the optical network 110 with other network devices functioning as service producers 130 and service consumers 140. Each service producer 130 or consumer 140 may access the optical network 110 via an edge node 120. ICN services 132 may be provided by the service producers 130, and ICN applications 142 may run on the service consumers 140. The ICN services 132 may receive service requests or service interests sent from the ICN applications 142, and respond to the service requests or interest with returned data.

The ICN services 132 and the applications 142 may be considered as overlaid over the service-aware optical network 110, thus propagation of service requests and returned data may go through the optical network 110. Accordingly, ICN service flows sent from a service producer 130 or a service consumer 140 may need to be converted to optical flows, which traverse the optical network 110. An ICN service flow may be any traffic flow in the ICN domain relevant to the requesting or fulfillment of one or more ICN services. The optical network 110 may be implemented using any suitable technology and as any suitable type of optical network(s), such as optical transport network (OTN), synchronous optical networking (SONET), and/or network using dense wavelength division multiplexing (DWDM) or based on optical packet or burst switching. The optical network 110 may be re-configurable or programmable, and the ICN applications and services may be built as a service-centric overlay on the optical network 110.

Figure 2:
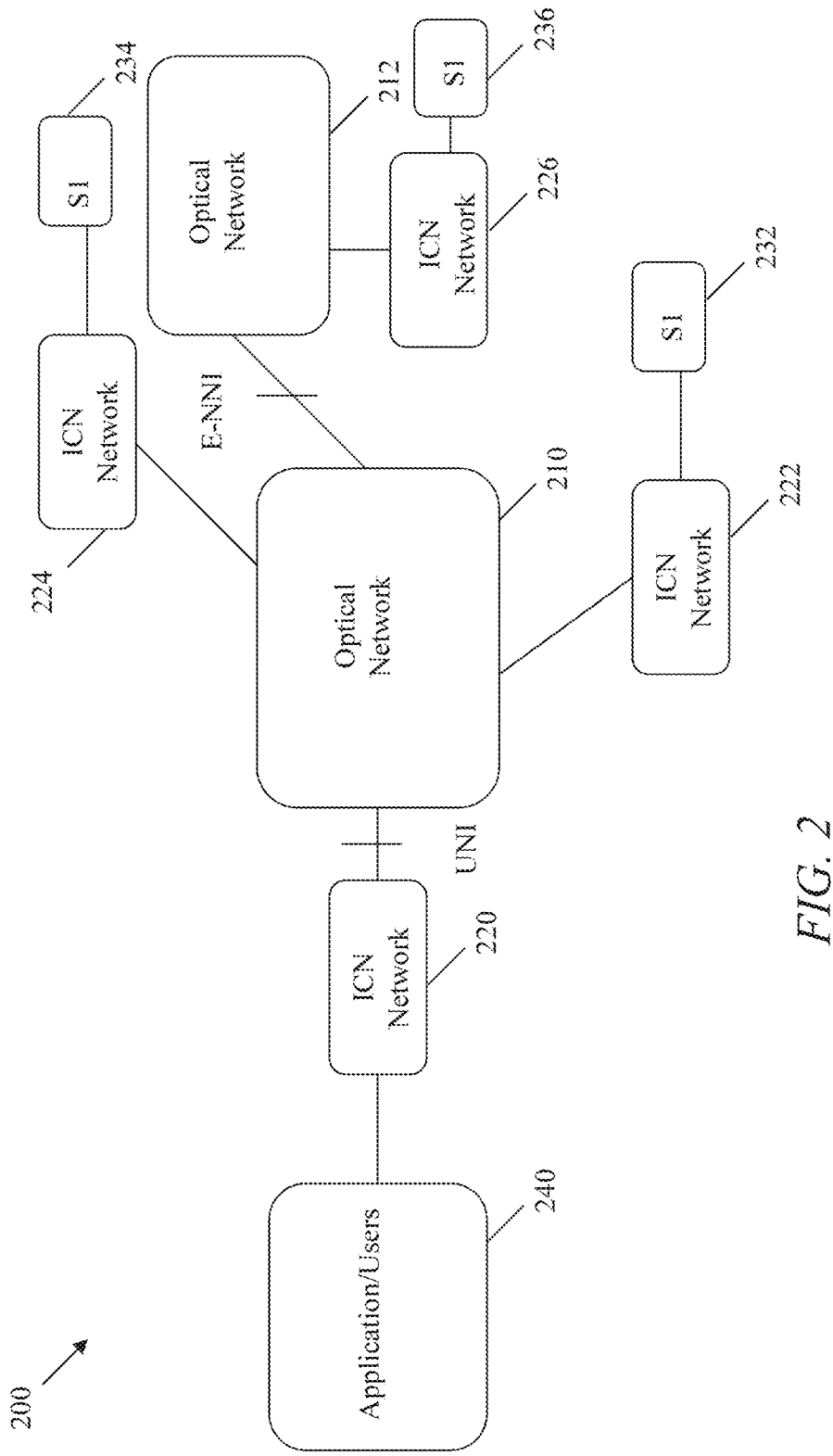
FIG. 2 illustrates another embodiment of a network architecture.

FIG. 2 illustrates another embodiment of a network architecture 200, some aspects of which may be similar to the architecture 100. The architecture 200 may comprise a plurality of optical networks including optical networks 210 and 212 (two shown as an example) that serve as core networks. A plurality of edge nodes may be deployed in each of the optical networks 210 and 212 to interconnect them with other networks such as ICN networks 220, 222, 224, and 226 (four shown as an example). For example, the ICN network 220 may be overlaid on the optical network 210 and may communicate with the optical network 210 via a user network interface (UNI). For another example, the optical networks 210 and 212 may communicate with each other via an external network-network interface (E-NNI).

ICN services and applications may be implemented in the ICN networks. As shown in FIG. 2 for example, a number of ICN services 232, 234, and 236 (denoted as S1) are provided by the ICN networks 222, 224, and 226, respectively, and one or more ICN applications 240 may be provided by the ICN network 220. The ICN services 232, 234, and 236 may receive service requests or service interests sent from the ICN applications 240, and respond to the service requests or interest with returned data.

In operation, to facilitate data communication between an ICN application and an ICN service, the propagation of service requests and returned data may first go through an ICN network, then through the optical network 210, and then through another ICN network. Accordingly, ICN service flows sent from a service (e.g., the ICN service 232) or a service consumer (e.g., an ICN application 240), en route to the other end, may need to be converted to optical flows that traverse the optical network 210. Overall, the network architecture 200 may use service abstraction which may allow virtual topology resources to be increased or decreased within the optical domain.

Figure 3:
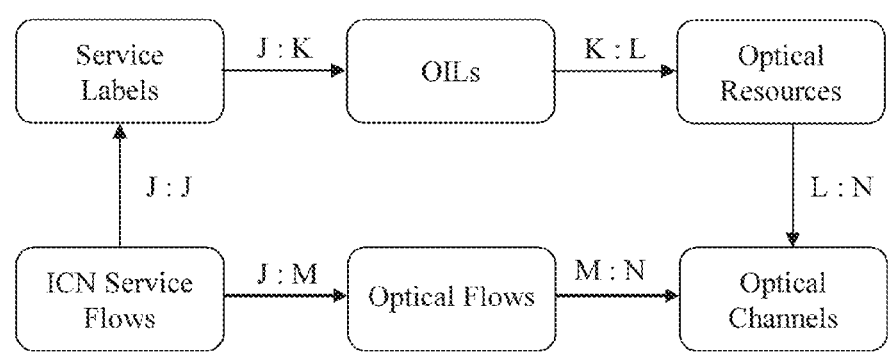
FIG. 3 illustrates an embodiment of an optical resource allocation architecture.

FIG. 3 illustrates an embodiment of an optical resource allocation architecture 300, which may be implemented by an edge node (e.g., an edge node 120) to map ICN service flows to optical resources. More specially, suppose that J, K, L, M, N are positive integers (note that they may or may not be equal), the edge node may determine mapping between J service labels and K OILs. Each of the J service labels may identify an ICN service flow, which may be received by the edge node. Further, each of the K OILs may describe connectivity between a set of consumers and producers which produce one or more services. Further, the edge node may allocate L optical resources to the K OILs adaptively based on one or more service requirements set by the J service labels. Further, the edge node may convert J ICN service flows identified by the J service labels to M optical flows based on the determined mapping between the J service labels and the K OILs. The edge node may further send the M optical flows onto N optical channels using optical resources allocated to the K OILs. The N optical channels may be part of the L optical resources or may be designated to be used by the L optical resources.

Figure 4:
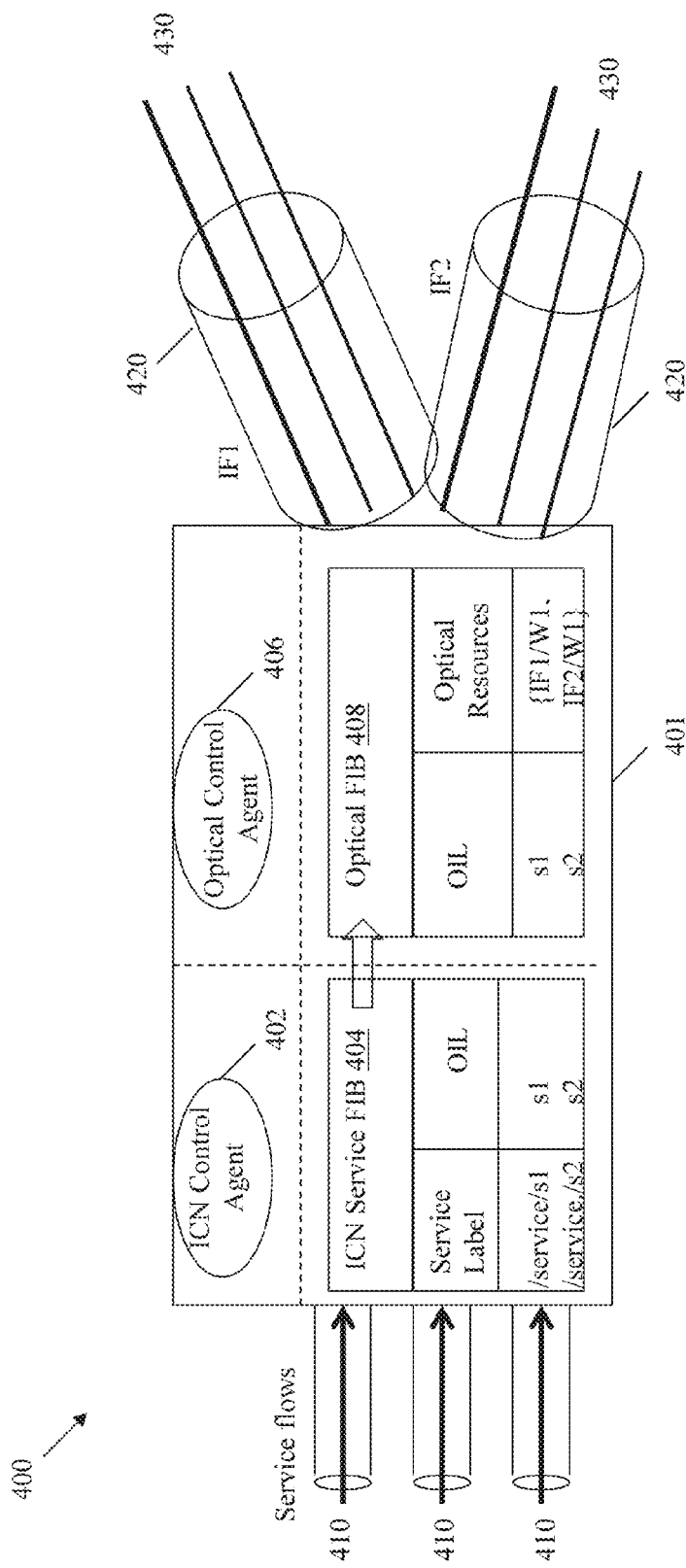
FIG. 4 illustrates an embodiment of a flow multiplexing architecture.

FIG. 4 illustrates an embodiment of a flow multiplexing architecture 400, which may be implemented by an edge node 401. Herein, multiplexing (Mux) may involve mapping ICN service flows to OILs, and demultiplexing (Demux) may involve mapping OILs back to ICN service flows. An OIL may describe a mapping between a set of consumers and producers of one or more services in an ICN plane and resources in an optical plane, wherein the ICN plane may be implemented as one or more ICN networks, and the optical plane may be implemented as one or more optical networks. In the architecture 400, the edge node 401 may be configured to receive one or more ICN service flows 410 from an ICN network. Note that an ICN service flow 410 may be sent from a service consumer and comprises a service request or interest packet. Alternatively, an ICN service flow 410 may be sent from a service producer and comprises returned data, which is generated by the service producer in response to a service request.

The edge node 401 may serve as an interconnection point or interface between an ICN network and an optical network. Accordingly, the edge node 401 may comprise an ICN portion and an optical portion. As shown in FIG. 4, the ICN portion may comprise an ICN control agent 402 and an ICN service forwarding information base (FIB) 404 coupled to the ICN control agent 402. The ICN service FIB 404 may store correspondance information between ICN service labels and OILs (e.g., abstract faces), which have been pre-mapped. For example, a service label denoted as /service/s1 may correspond to an OIL denoted as s1. Similarly, the optical portion of the edge node 401 may comprise an optical control agent 406 and an optical FIB 408 coupled to the optical control agent 406. The optical FIB 408 may store correspondance information between OILs and optical resources, which two have been pre-mapped. For example, an OIL denoted as s1 may correspond to optical resources denoted as IF1/W1, while an OIL denoted as s2 may correspond to optical resources denoted as IF2/W1, wherein IF1 and IF2 denote two optical ports or channels 420, and W1 denotes a wavelength. Note that the optical resource of any granularity may be used here by the optical transport layer to carry data. Briefly, the ICN service FIB 404 may abstract connectivity on the service level, and the optical FIB 408 may map OIL to optical resources. The edge node 401 and/or the optical channels 420 may comprise optical circuits such as wavelength circuits.

Each of the ICN service flows 410 may be identifiable by a service label. Thus, after receiving the ICN service flows 410, the ICN control agent 402 may use the ICN service FIB 404 to map the ICN service flows 410 to one or more OILs. Next, the optical control agent 406 may use the optical FIB 408 to map the one or more OILs to at least one optical resource. In other words, the optical control agent 406 may determine at least one optical resource to be provisioned to the service flows 410 based on their respective service labels. Note that a service label may be extended beyond a single domain, hence ICN flows may be treated the same way across multiple domains.

Further, the service flows 410 may be converted to one or more optical flows 430, which may then be transmitted by the edge node 401 onto the optical channels 420 using the optical resources provisioned to the ICN service flows. The transmission of each optical flow 430 may use optical resource(s) provisioned to the respective optical flow 430. Optical resources, which may be provisioned to OILs and optical flows, include but are not limited to: bandwidth, wavelength, power, sub-wavelength, packet slots, burst slots, and burst headers. A person of ordinary skill in the art will recognize how the optical resources may be utilized in the transmission and traveling of the optical flows 430 in an optical network (e.g., the optical network 110).

Mapping between ICN service flows and OILs may be 1:M, 1:1, or M:M, at the service level. The granularity may depend on the optical resources and service granularity. For example, the quality of service (QoS) or security requirements of a service, e.g., close to best-effort delivery or less-stringent QoS requirements, may allow conversion of multiple ICN service flows to one optical flow. Knowledge of the OILs may be global within an optical domain comprising the edge node 401, hence optical resources dedicated to a service can be adapted based on service requirements of the service. Service requirements may be associated with or determined by service names and contexts of ICN services, and may include, but are not limited to, QoS, security requirement, time sensitivity, etc. For example, in an ICN service that provides video conferencing (named X-group video conferencing, where X denotes number of attendees), it may be required that the allocated bandwidth is larger than 20 megabits per second (Mbs) per-person and time delay is less than 3 seconds, as the video conference is an interactive session in real-time. The optical resources may be shared within the X-group for a certain period (e.g., 2 hours).

On the other hand, sometimes multiple ICN flows may share the same optical resource, for example, in multiplexing or demultiplexing among OILs. On the other hand, one ICN service flow may be converted to a plurality of optical flows, which may then be sent to different destinations. For example, the edge node 401 may receive, from an ingress interface, a service interest (one type of service flow) requesting for a service, while there may be multiple service providers providing the service. The service providers may be located in ICN network(s), which are connected via optical transport or network. In this case, the edge node 401 may duplicate or multicast the incoming service interest, and map each duplicated interest to one OIL label. The service interest may be converted to multiple optical flows, which may be sent to different optically connected destinations. Also in a path for returned data, a single ICN service response can be mapped to multiple OILs destined to different ICN-optical edge nodes.

In an embodiment, service interests from users may be aggregated based on names from the interest headers. The aggregated interests may be mapped service flows 410, and the ICN service FIB 404 may be looked up to map the service flows 410 to one or more OILs (e.g., faces). The service flows 410 may be classified based on various factors such as their aggregated properties (e.g., type of service, service context, next hop, virtual private network), location semantics (e.g., of a service provider), or the type of a service provider. Further, the OILs may be mapped to optical service labels, which may be mapped to optical resources. Note that the optical resource itself may be mapped to multicast, point-to-point resource(s). With granular resource such as burst switching, more granular integration may be realized between ICN service flows and optical networks. In this case, more abstraction may be realized to take advantage of the routing and multiplexing capability.

Figure 5:
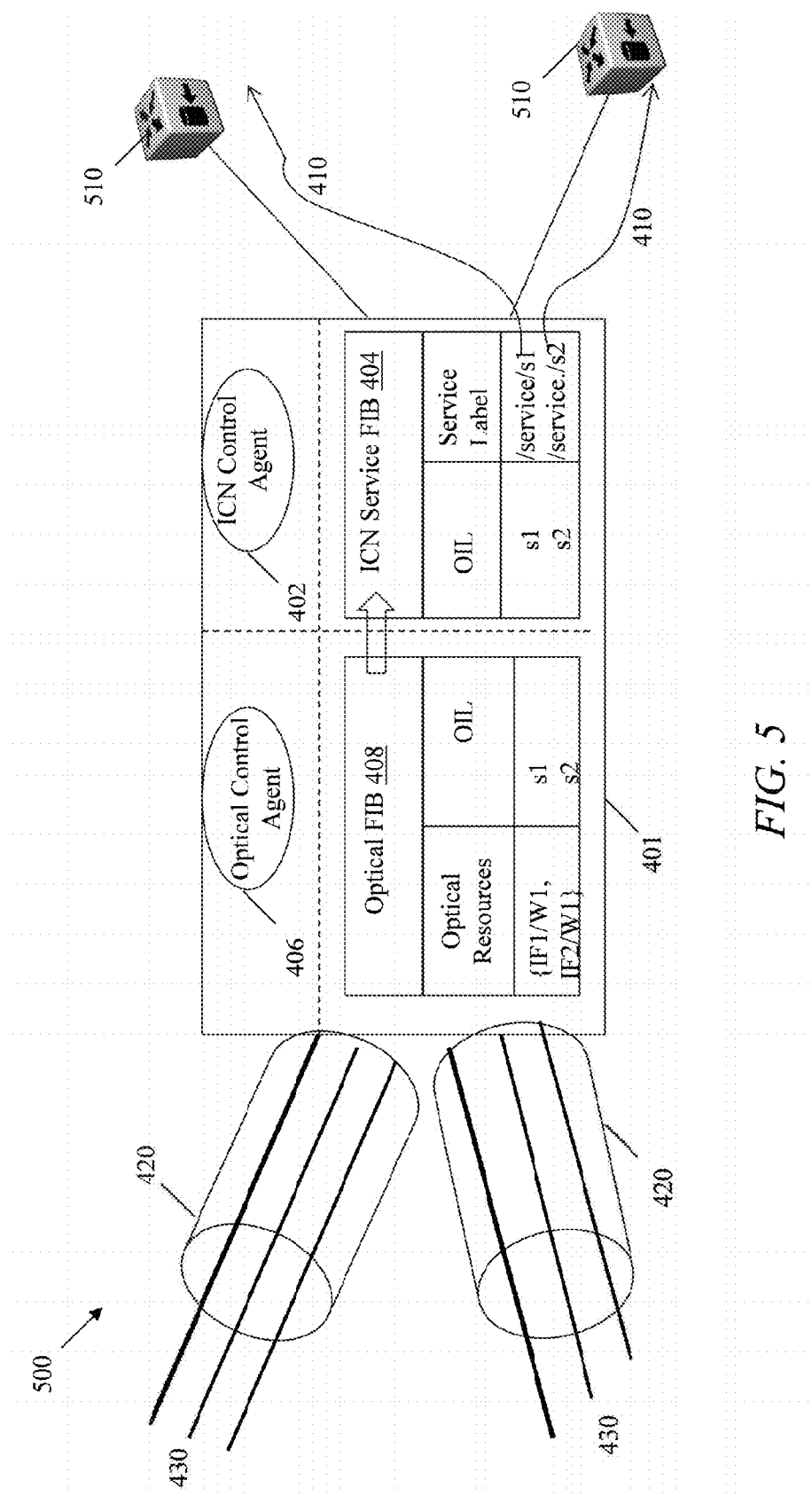
FIG. 5 illustrates an embodiment of a flow demultiplexing architecture.

FIG. 5 illustrates an embodiment of a flow demultiplexing architecture 500, which may also be implemented by the edge node 401. The demultiplexing architecture 500 may be considered a reversal of the multiplexing architecture 400. More specifically, in the architecture 500, the edge node 401 may be configured to receive one or more optical flows 430 from an optical network. Note that an optical flow 430 may carry information indicating a service request or returned data. The optical flows 430 may comprise wavelength flows or may use various multiplexing mechanisms such as burst switching or optical-packet switching.

Since an optical flow 430 may have been allocated or provisioned a certain set of optical resources on the way to the edge node 401, the edge node 401 may detect or determine what optical resources have been used by the optical flow. Then, the optical control agent 406 may use the optical FIB 408 to map the optical flows 430 to one or more OILs, based on the optical resources used by the optical flows 430. In the case of multicasting, multiple optical flows 430 may be mapped to an OIL. Next, the ICN control agent 402 may use the ICN service FIB 404 to map the one or more OILs to at least one ICN service labels. Further, the one or more optical flows 430 may be converted to at least one ICN service flow 410, which may then be transmitted by the edge node 401 to one or more network nodes 510 residing in an ICN network.

Figure 6:
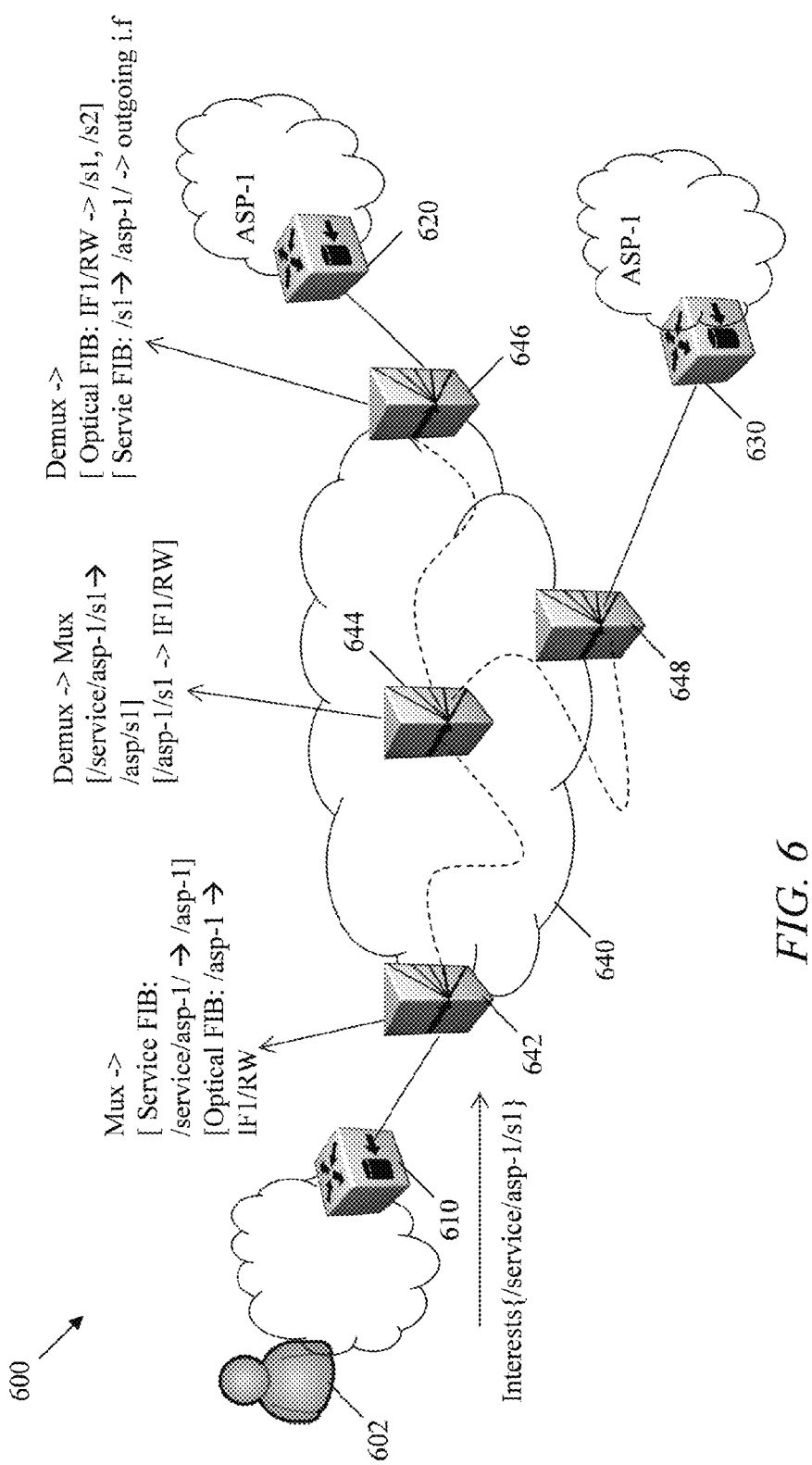
FIG. 6 illustrates an embodiment of a resource reallocation method.

FIG. 6 illustrates an embodiment of a resource reallocation method 600, which may be used in a network architecture. Suppose that a user 602 requests a service by sending out a service flow comprising an interest packet to a network device 610. The service may be provided by two application service providers (ASPs) 620 and 630 which are denoted as ASP-1 and ASP-2, respectively. The network device 610 and the ASPs 620 and 630 may be located in different ICN networks, which may be interconnected by an underlying optical network 640. The optical network 640 may comprise an intermediate network node 644 and a number of edge nodes 642, 646, and 648.

As discussed previously, when the service flow reaches the edge node 642, multiplexing may occur and the service flow may be allocated a set of optical resources (denoted as IF1/RW in FIG. 6). The service flow may be converted to an optical flow at the edge node 642 and then transmitted to the intermediate network node 644. Since the intermediate network node 644 has paths to both ASPs 620 and 630, the network node 644 may determine or decide to select either of the ASPs, e.g., the ASP 620 as a preferred provider. Thus, the optical flow may be routed to the ASP 620.

As conditions may change over time or by configuration, the ASP 630 may become a more preferred provider of the service than the ASP 620. In this case, the network node 644 may reallocate optical resources to the ASP 630 by performing demultiplexing and multiplexing operations, which may first convert an optical signal to an electrical signal and then back to an optical signal, dubbed as Optical-Electrical-Optical (OEO). The OEO process may remap service labels to OILs and to optical resources. For example, optical ports and/or wavelength originally allocated to the ASP 620 may be reallocated to the ASP 630, so that the optical flow sent by the network node 644 may be routed to the ASP 630. As a result of remapping, the optical resources may be better used for the service. Relatively speaking, multiplexing at the edge nodes may be coarse, while multiplexing at the intermediate network node 644 may be granular. The method 600 may be used to satisfy multi-point-to-multi-point (MP2MP) multicast requirements at ICN layer to optical fabric. Multiple such intermediate nodes can be used in the optical infrastructure to suite ICN service requirements.

Figure 7:
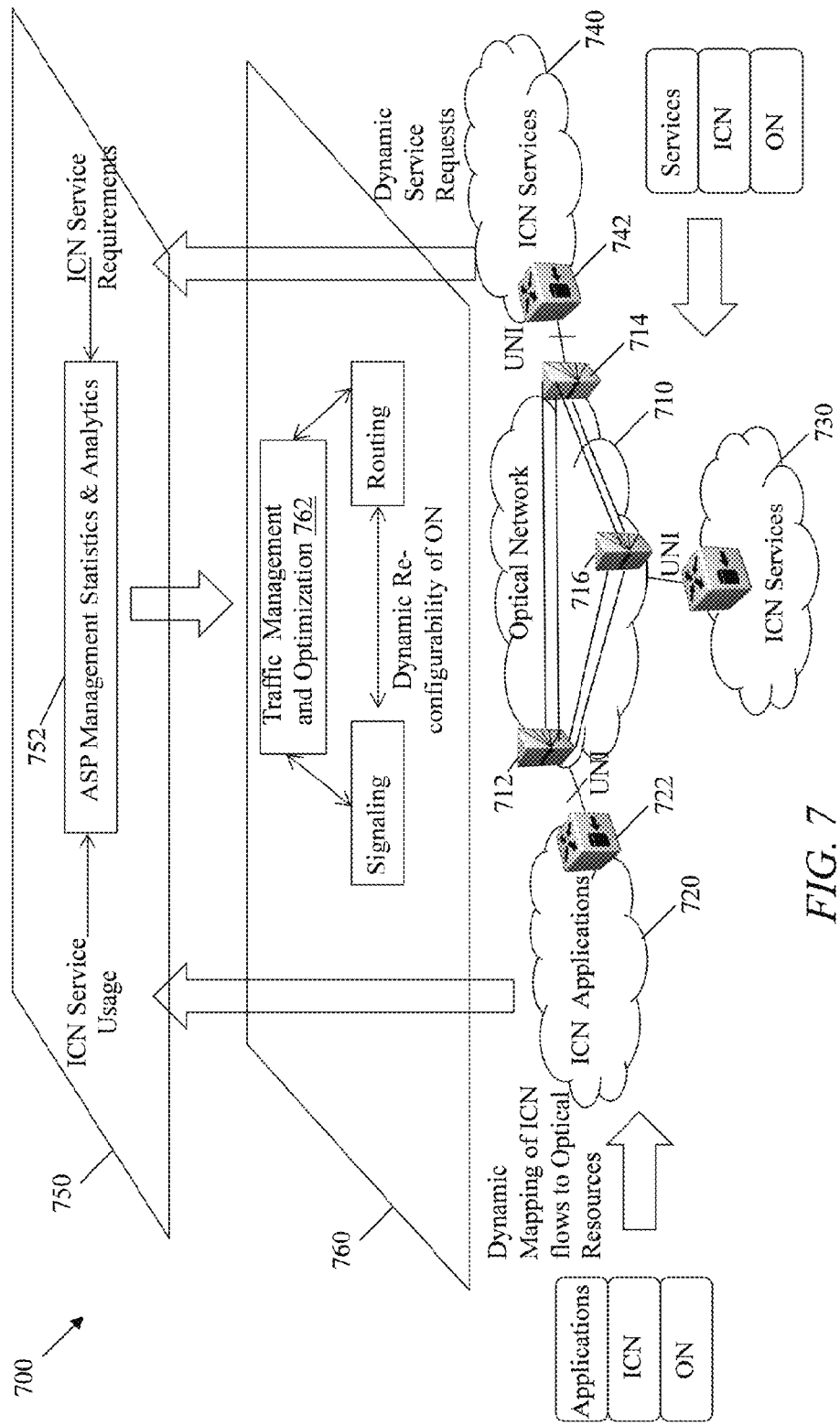
FIG. 7 illustrates an embodiment of a management architecture.

FIG. 7 illustrates an embodiment of a management architecture 700, which may manage mapping between ICN service flows and optical resources through a unified control plane. A method of operating the architecture 700 is as follows. As shown in FIG. 7, a network architecture may comprise an optical network 710 and a number of ICN networks 720, 730, and 740 interconnected with the optical network 710. ICN applications may run on a network node 722 in the ICN network 720, and ICN services may run on a network node 742 in the ICN network 740. On the user side, the network architecture may comprise several layers including a top layer with ICN applications, an intermediate ICN layer, and an optical networking (ON) layer. Thus, dynamic mapping of ICN service flows to optical resources may occur between the ICN layer and the optical networking layer. On the provider side, the network architecture may comprise several layers including a top layer with ICN services, an intermediate ICN layer, and an ON layer underneath the ICN layer.

In the architecture 700, a first control plane 750 may be used for the ICN networks and a second control plane 760 may be used for the optical network. Note that the control planes 750 and 760 may be logically separated, but implemented on single physical platform (e.g., in the same device). The control planes 750 and 760 may interact to form a unified control plane. Specifically, ICN services can determine some pattern for usage in terms of demand, thus a functional module 752 for ASP management statistics and analytics located in the control plane 750 may receive ICN service usage information and ICN service requirements from the consumer and provider sides of ICN services. Using its input, the module 752 may direct the operation of a traffic management and optimization module 762, which is located in the control plane 760. Using information from the functional module 752, the traffic management and optimization module 762 may implement signaling and routing functions to realize dynamic re-configurability of the optical network 710. As a result, optical resources may be dynamically reconfigured based on demands of service consumers. The planes 750 and 760 may be configured to manage mapping between ICN service flows and optical resources, e.g., at edge nodes 712, 714, and 716. The unified plane may further handle location independence of flows for service consumers and producers. ICN producers may wish to have multicasting for load balancing, routing scalability, and other functionalities, which may be enabled through the unified plane. For example, from a consumer's perspective, a multicast request may send a service flow to multiple source points where a service is provided. From a producer's perspective, the unified plane may handle service dynamism, allow dynamic provision of new service points, and migration of services from one source point to another.

Figure 8:
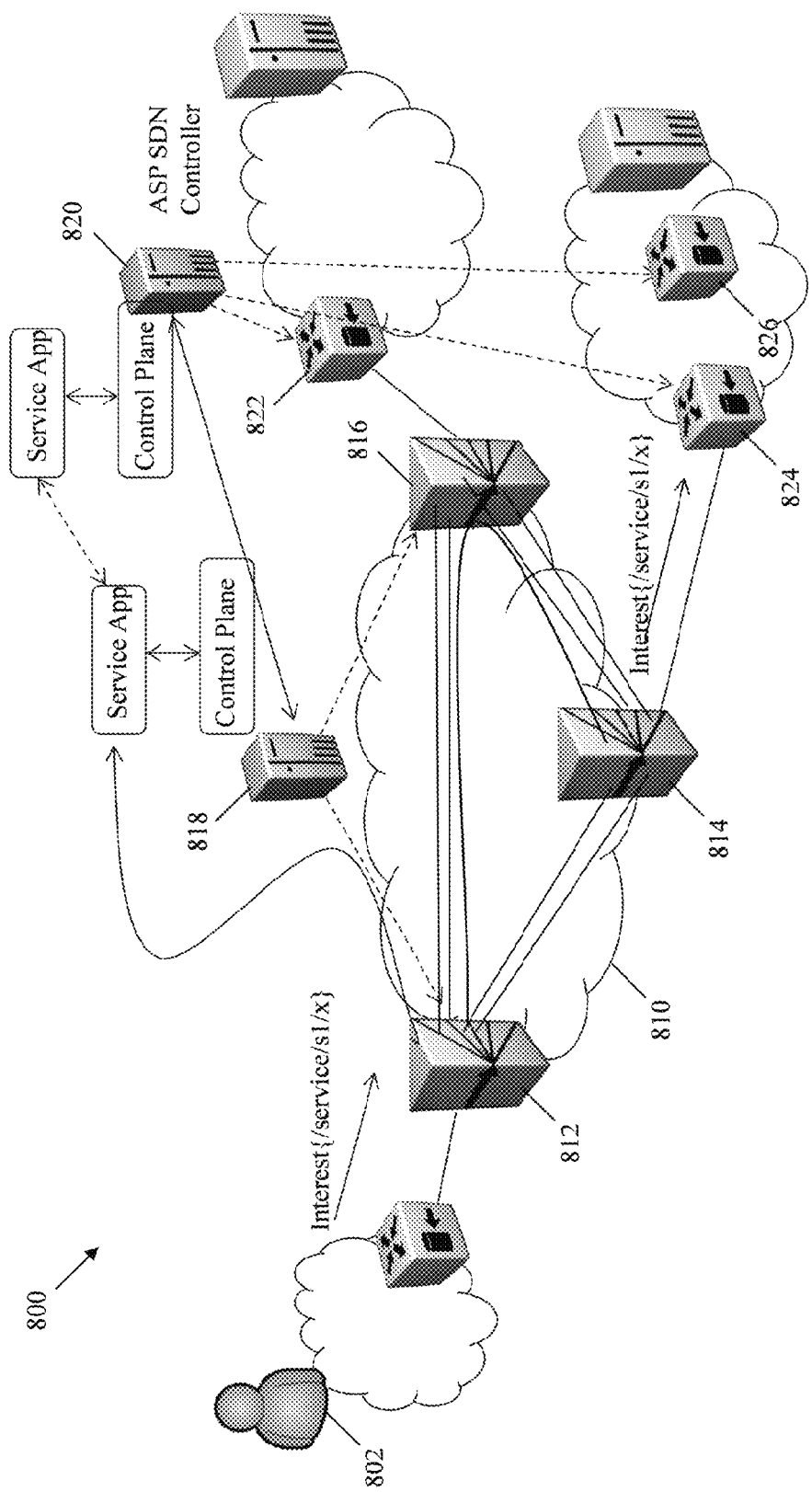
FIG. 8 illustrates an embodiment of a software defined network (SDN) enabled implementation.

FIG. 8 illustrates an embodiment of an SDN enabled implementation 800, in which SDN controllers may commit optical resources to a particular optical flow. As shown in FIG. 8, an optical network 810 may comprise a plurality of edge nodes 812, 814, and 816, which may be managed by an SDN controller 818. The SDN controller 818 may be a centralized entity configured to serve as the control plane of the optical network 810. Similarly, there may be another SDN controller 820 configured to manage network devices 822, 824, and 826, which may be located in one or more ASP domains. In operation, a user 802 may request service from a service provider (e.g., the network device 824 may be the service provider). When executing the service request, the edge node 812 may serve as a multiplexing point where a service flow may be provisioned with optical resources and converted to one or more optical flows.

Suppose that the edge node 812 does not have any optical resource already mapped to the incoming service request, in the implementation 800, the edge node 812 may send a message to the SDN controller 818 to indicate the lack of optical resource. Accordingly, one or more service applications running on the SDN controller 818 may interact with one or more service applications running on the SDN controller 820 to commit appropriate optical resources to direct the incoming service request. Thus, the SDN enabled implementation 800 may allow more practical and flexible service level interactions than GMPLS. Further, signaling can be intelligent to create optical multicast tree to optimize the usage of optical resources.

Figure 9:
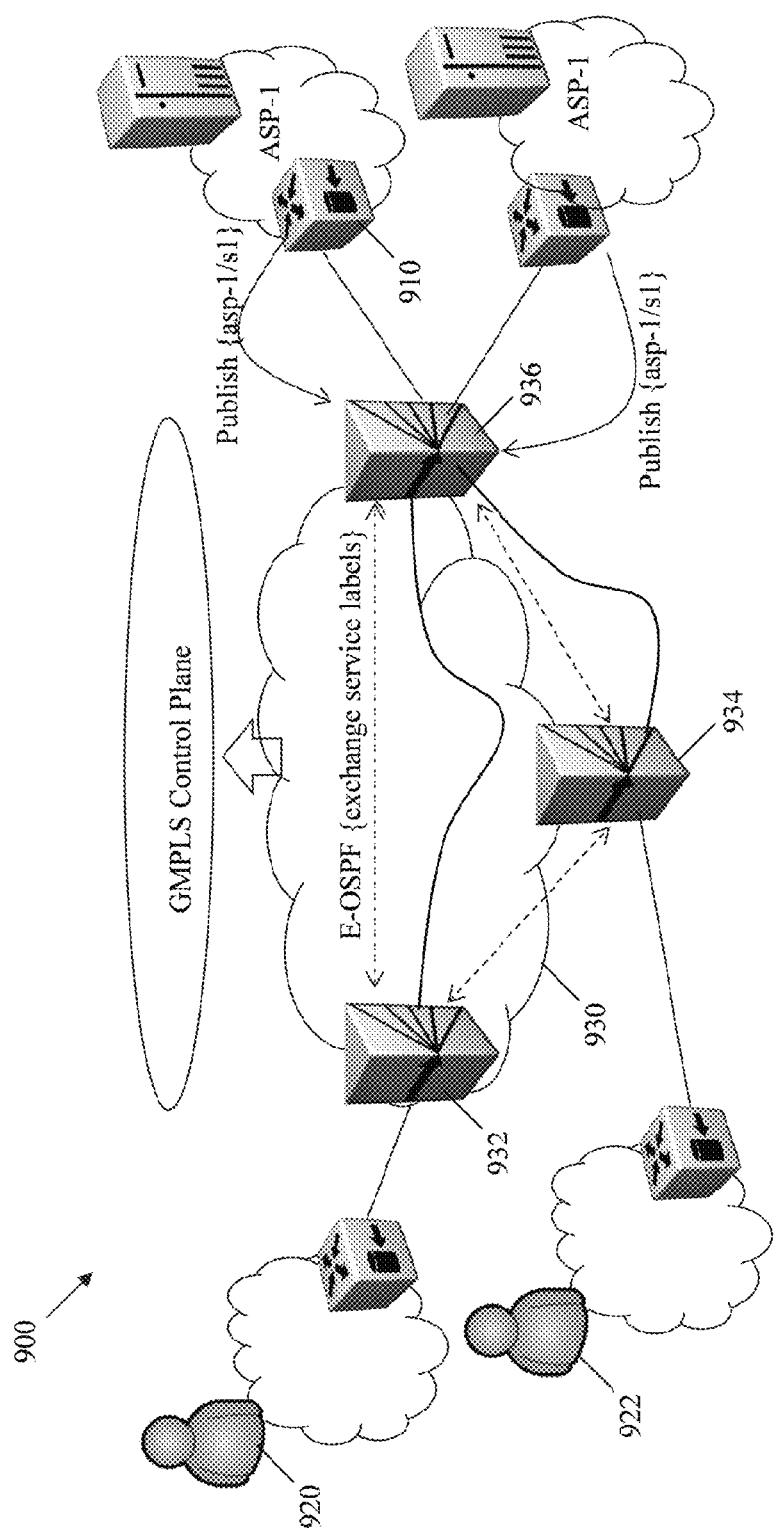
FIG. 9 illustrates an embodiment of a distributed architecture.

FIG. 9 illustrates an embodiment of a distributed architecture 900, in which GMPLS labels may be extended to accommodate OILs and/or service labels, and a method of operating same. In the architecture 900, an ASP 910 may publish a service and be aware that there are multiple users 920 and 922, which may be subscribers of the service located at different points. The ASP 910 may then set up optical circuits to enable signal transmission to the users 920 and 922 in a distributed manner. It should be understood that, in the distributed architecture 900, the resource provisioning itself may also be dynamically driven using the service analytics engine shown in FIG. 7.

A publish action of the service by the ASP 910 may cause service labels to be exchanged via a routing protocol between edge nodes 932, 934, and 936 located in an optical network 930. For example, an extended open shortest path first (OSPF) protocol may be used to exchange service labels stored in the edge nodes 932 and 936.

In an embodiment, the ASP 910 may publish a service to a service proxy managing the service ASP domains. The service proxy may pass information of the service to an optical network controller implementing a GMPLS control plane. The optical network controller may then be used to set up the mapping between service label of the service and corresponding OILs. The edge node 936 may receive, from the GMPLS control plane, a data path through which the optical flows may travel en route to the users 920 and 922, and the data path is determined by the GMPLS control plane taking into account global topology of the optical network and dynamic requirements of services, which may be obtained by the GMPLS control plane via service monitoring. Service monitoring may be continuous or intermittent as long as the dynamism (variation with time) of service requirements may be captured. Transmitting the optical flows may follow the data path determined by the control plane. In use, signaling a path that considers the global topology and path computation may result in the mapping of service label to optical resources. Further, the path may need to be pre-established before handling service interests for a given service.

Figure 10A:
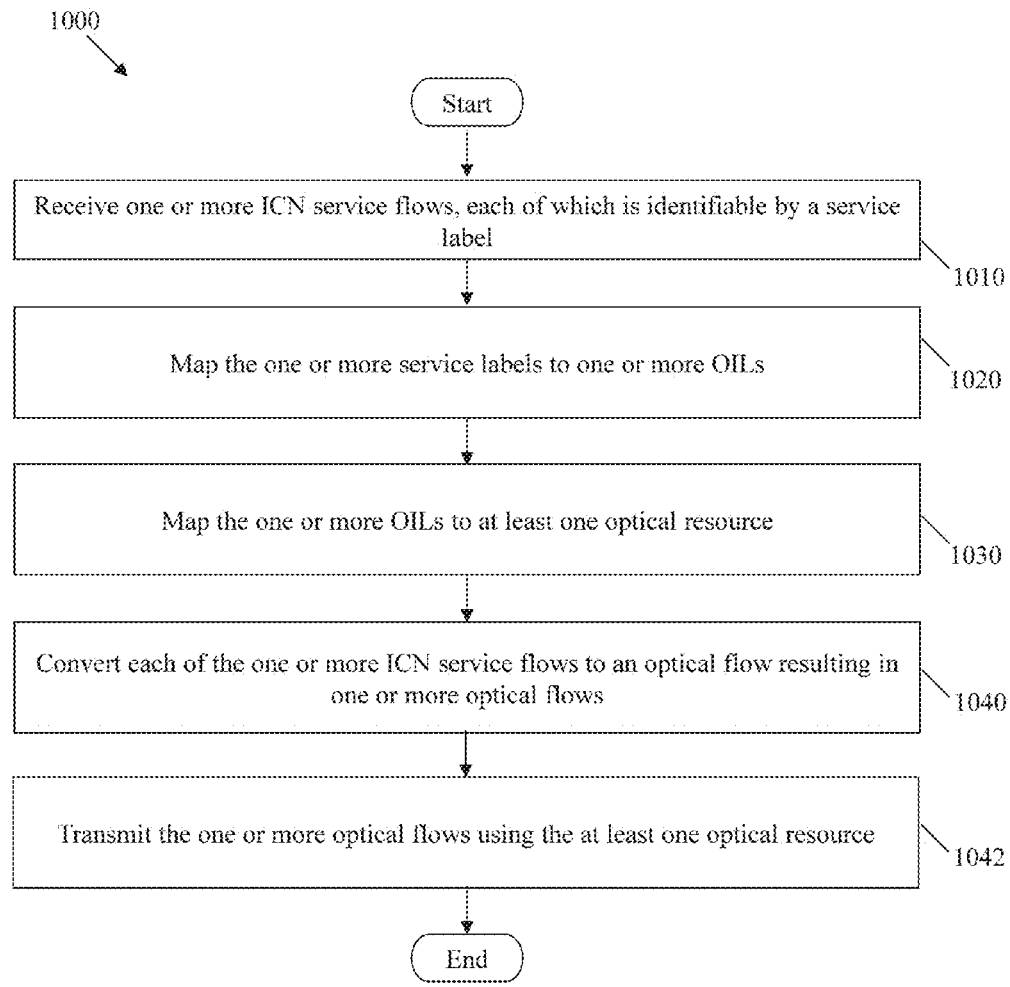
FIGS. 10A and 10B illustrate embodiments of a service processing method.

FIG. 10A illustrates an embodiment of a service processing method 1000, which may be implemented by an edge node (e.g., the edge node 401) to multiplex one or more ICN service flows. The method 1000 starts in step 1010, in which the edge node may receive one or more ICN service flows, each of which is identifiable by a service label. In step 1020, the edge node may map the one or more service labels to one or more OILs, which may be stored in the edge node or obtained from a SDN controller. In step 1030, the edge node may map the one or more OILs to at least one optical resource. Note that the steps 1020 and 1030 may be considered as one step, in which the edge node may determine at least one optical resource to be provisioned to the one or more service flows based on the one or more service labels. In step 1040, the edge node may convert each of the one or more ICN service flows to an optical flow resulting in one or more optical flows. In step 1042, the edge node may transmit the one or more optical flows using the at least one optical resource.

Figure 10B:
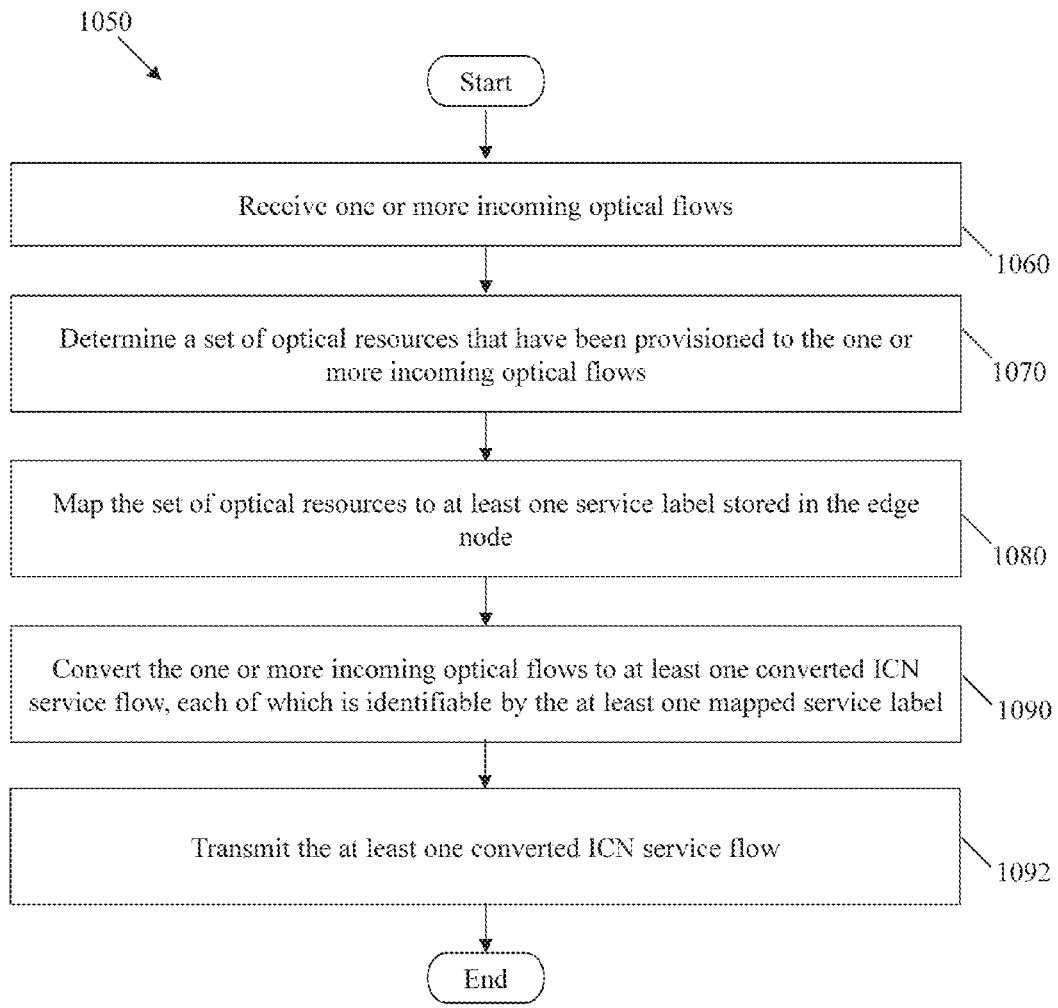

FIG. 10B illustrates an embodiment of a service processing method 1050, which may be implemented by an edge node (e.g., the edge node 401) to demultiplex one or more incoming optical flows. The method 1050 starts in step 1060, in which the edge node may receive one or more incoming optical flows. In step 1070, the edge node may determine a set of optical resources that have been provisioned to the one or more incoming optical flows. Note that the set of optical resources may have been determined when it was transmitted from a service provider or consumer. In step 1080, the edge node may map the set of optical resources to at least one service label stored in the edge node. In step 1090, the edge node may convert the one or more incoming optical flows to at least one converted ICN service flow, each of which is identifiable by the at least one mapped service label. In step 1092, the edge node may transmit the at least one converted ICN service flow.

Note that the methods 1000 and 1050 may be independent of each other, or they may correspond to each other. For example, the one or more ICN service flows in the method 1000 may comprise a service request sent from a service consumer, and the at least one converted ICN service flow in the method 1050 may comprise returned data which has been generated by one or more service providers that provide one or more services in response to the service request. A person of ordinary skill in the art will recognize that variations of the methods, such as adding additional steps, skipping or merging some steps, and changing execution orders, may exist and are within the scope of this disclosure.

Figure 11:
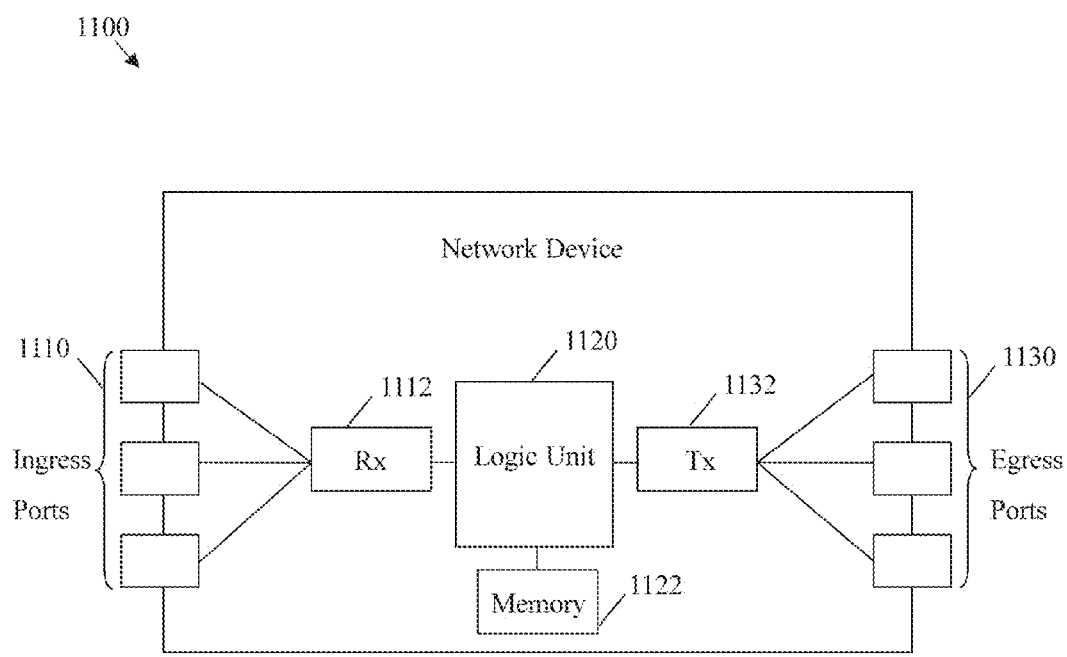
FIG. 11 illustrates an embodiment of a network device.

FIG. 11 illustrates an embodiment of a network device or unit 1100, which may be configured to facilitate transportation of ICN service flows or optical flows through a network. The network device 1100 may comprise one or more ingress ports 1110 coupled to a receiver 1112 (Rx), which may be configured for receiving service or optical flows comprising packets or frames, objects, options, and/or type length values (TLVs) from other network components. The network device 1100 may comprise a logic unit or processor 1120 coupled to the receiver 1112 and configured to process the packets or otherwise determine to which network components to send the packets. The logic unit or processor 1120 may be implemented using hardware or a combination of hardware and software. The network device 1100 may further comprise a memory 1122, in which one or more FIBs (e.g., the ICN service FIB 404 and the optical FIB 408) may be stored. The network device 1100 may also comprise one or more egress ports 1130 coupled to a transmitter 1132 (Tx), which may be configured for transmitting packets or frames, objects, options, and/or TLVs to other network components. The logic unit or processor 1120, the receiver 1112, and the transmitter 1132 may also be configured to implement or support at least part of any of the schemes and methods described above, such as the optical resource allocation architecture 300, the flow multiplexing architecture 400, the flow demultiplexing architecture 500, the resource reallocation method 600, the management architecture 700, the SDN enabled implementation 800, and the service processing methods 1000 and 1050.

Figure 12:
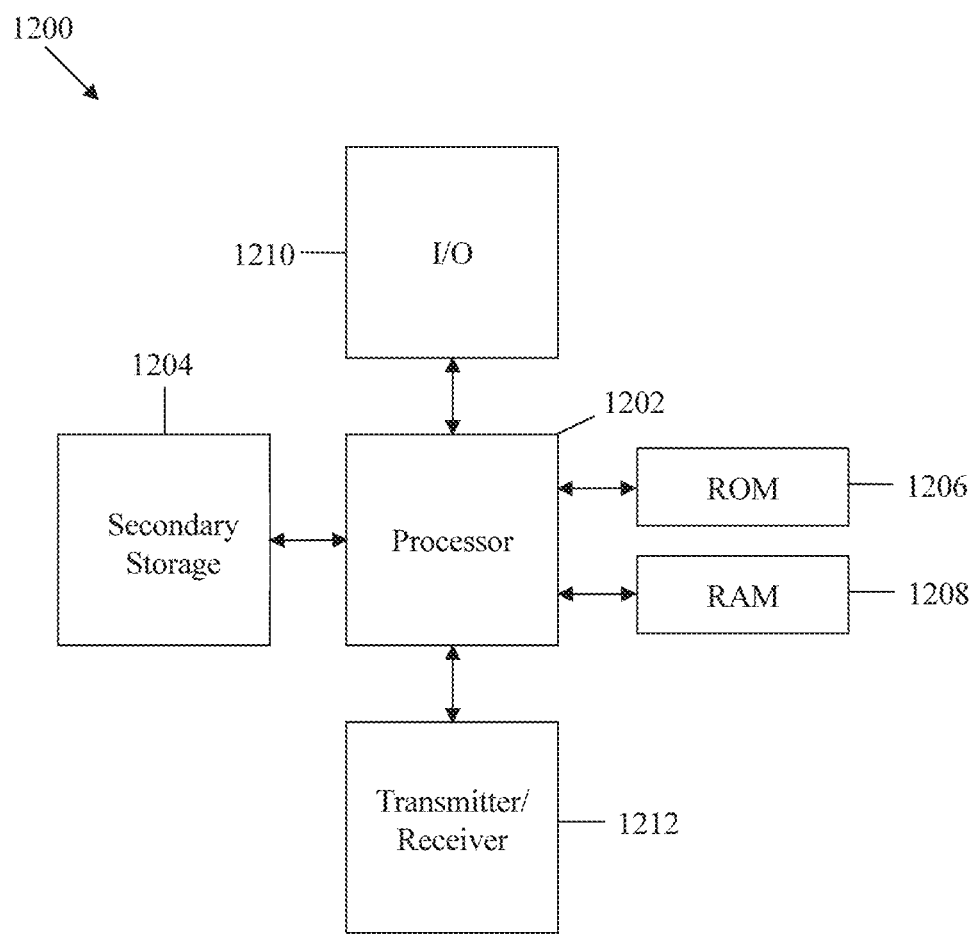
FIG. 12 illustrates an embodiment of a computer system.

The schemes described above may be implemented on a network component, such as a computer or network component with sufficient processing power, memory resources, and network throughput capability to handle the necessary workload placed upon it. FIG. 12 illustrates an embodiment of a computer system or network node 1200 suitable for implementing one or more embodiments of the systems disclosed herein, such as the edge nodes 120 and 401, or the SDN controllers 818 and 820 described above.

The computer system 1200 includes a processor 1202 that is in communication with memory devices including secondary storage 1204, read only memory (ROM) 1206, random access memory (RAM) 1208, input/output (I/O) devices 1210, and transmitter/receiver (transceiver) 1212. Although illustrated as a single processor, the processor 1202 is not so limited and may comprise multiple processors. The processor 1202 may be implemented as one or more central processor unit (CPU) chips, cores (e.g., a multi-core processor), field-programmable gate arrays (FPGAs), application specific integrated circuits (ASICs), and/or digital signal processors (DSPs). The processor 1202 may be configured to implement at least part of any of the schemes described herein, including the optical resource allocation architecture 300, the flow multiplexing architecture 400, the flow demultiplexing architecture 500, the resource reallocation method 600, the management architecture 700, the SDN enabled implementation 800, and the service processing methods 1000 and 1050. The processor 1202 may be implemented using hardware or a combination of hardware and software.

The secondary storage 1204 is typically comprised of one or more disk drives or tape drives and is used for non-volatile storage of data and as an over-flow data storage device if the RAM 1208 is not large enough to hold all working data. The secondary storage 1204 may be used to store programs that are loaded into the RAM 1208 when such programs are selected for execution. The ROM 1206 is used to store instructions and perhaps data that are read during program execution. The ROM 1206 is a non-volatile memory device that typically has a small memory capacity relative to the larger memory capacity of the secondary storage 1204. The RAM 1208 is used to store volatile data and perhaps to store instructions. Access to both the ROM 1206 and the RAM 1208 is typically faster than to the secondary storage 1204.

The transmitter/receiver 1212 (sometimes referred to as a transceiver) may serve as an output and/or input device of the computer system 1200. For example, if the transmitter/receiver 1212 is acting as a transmitter, it may transmit data out of the computer system 1200. If the transmitter/receiver 1212 is acting as a receiver, it may receive data into the computer system 1200. Further, the transmitter/receiver 1212 may include one or more optical transmitters, one or more optical receivers, one or more electrical transmitters, and/or one or more electrical receivers. The transmitter/receiver 1212 may take the form of modems, modem banks, Ethernet cards, universal serial bus (USB) interface cards, serial interfaces, token ring cards, fiber distributed data interface (FDDI) cards, and/or other well-known network devices. The transmitter/receiver 1212 may enable the processor 1202 to communicate with an Internet or one or more intranets. The I/O devices 1210 may be optional or may be detachable from the rest of the computer system 1200. The I/O devices 1210 may include a display. The I/O devices 1210 may also include one or more keyboards, mice, or track balls, or other well-known input devices.

It is understood that by programming and/or loading executable instructions onto the computer system 1200, at least one of the processor 1202, the secondary storage 1204, the RAM 1208, and the ROM 1206 are changed, transforming the computer system 1200 in part into a particular machine or apparatus (e.g. an edge node or a server (e.g., the edge node 401) having the functionality taught by the present disclosure). The executable instructions may be stored on the secondary storage 1204, the ROM 1206, and/or the RAM 1208 and loaded into the processor 1202 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hard-wires the instructions of the software. In the same manner, as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose CPU) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc ROM (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed herein and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented by an edge node in an optical network, the method comprising:
   receiving, by the edge node, one or more information centric networking (ICN) service flows from an ICN network, wherein each of the one or more ICN service flows is identifiable by a service label, wherein the edge node functions as an interface between the optical network and the ICN network overlaid on the optical network;
   determining, by the edge node, at least one optical resource to be provisioned to the one or more ICN service flows based on one or more service labels corresponding to the one or more ICN service flows;
   converting, by the edge node, the one or more ICN service flows to one or more optical flows, wherein converting the one or more ICN service flows to the one or more optical flows comprises mapping the one or more service labels to one or more optical information labels (OILs) stored in the edge node, wherein the service label identifies an ICN service flow, and wherein an OIL describes a mapping between a set of consumers and producers of one or more services in an ICN plane; and
   transmitting, by the edge node, the one or more optical flows over the optical network using the at least one optical resource.

2. The method of claim 1, further comprising:
   receiving one or more incoming optical flows;
   determining a set of optical resources that have been provisioned to the one or more incoming optical flows;
   mapping the set of optical resources to at least one service label stored in the edge node;
   converting the one or more incoming optical flows to at least one converted ICN service flow, each of which is identifiable by the at least one mapped service label; and
   transmitting the at least one converted ICN service flow.

3. The method of claim 2, wherein the one or more ICN service flows comprise a service request, and wherein the at least one converted ICN service flow comprises returned data which has been generated by one or more service providers that provide one or more services in response to the service request.

4. The method of claim 1, wherein an ICN service flow in the one or more ICN service flows is converted to a plurality of optical flows, wherein the ICN service flow comprises a service request for a service, and wherein the plurality of optical flows are transmitted, using at least a portion of the at least one optical resource, to a plurality of service providers that provide the service in response to the service request.

5. The method of claim 1, wherein the at least one optical resource comprises at least one of bandwidth, wavelength, power, sub-wavelength, packet slot, and burst slot.

6. The method of claim 1, wherein determining the at least one optical resource based on the one or more service labels comprises:
   mapping the one or more OILs to the at least one optical resource.

7. The method of claim 1, wherein determining the at least one optical resource based on the one or more service labels comprises:
   sending, to a software defined network (SDN) controller in the optical network, a message indicating that the at least one optical resource needs to be provisioned to the one or more ICN service flows;
   receiving, from the SDN controller, the one or more OILs corresponding to the at least one optical resource; and
   mapping the one or more OILs to the at least one optical resource.

8. The method of claim 1, further comprising receiving, from a generalized multi-protocol label switching (GMPLS) control plane, a data path through which an optical flow in the one or more optical flows travels en route to a destination of the optical flow, wherein the data path is determined by the GMPLS control plane taking into account global topology of the optical network and service requirements based on service monitoring by the GMPLS control plane, and wherein the optical flow is transmitted to a network node in the data path.

9. The method of claim 1, wherein the at least one optical resource comprises an optical transmission parameter.

10. A network device that functions as an edge node interconnecting an optical network and an information centric network (ICN), the network device comprising:
    at least one receiver configured to receive one or more ICN service flows from an ICN application;

a processor coupled to the at least one receiver and
configured to:
   determine at least one optical resource to be provisioned to the one or more ICN service flows based on service requirements specified by the one or more ICN service flows; and
   convert the one or more ICN service flows to one or more optical flows, wherein converting the one or more ICN service flows to one or more optical flows comprises mapping one or more service labels to one or more optical information labels (OILs) stored in the edge node, wherein a service label identifies an ICN service flow, and wherein an OIL describes a mapping between a set of consumers and producers of one or more services in an ICN plane; and
at least one transmitter coupled to the processor and configured to transmit the one or more optical flows using the at least one optical resource.

11. The network device of claim 10, wherein the at least one receiver is further configured to receive one or more incoming optical flows, wherein the processor is further configured to:
   determine a set of optical resources that have been provisioned to the one or more incoming optical flows;
   map the set of optical resources to at least one service label stored in the edge node; and
convert the one or more incoming optical flows to at least one converted ICN service flow, each of which is identifiable by the at least one mapped service label,
   and wherein the at least one transmitter is further configured to transmit the at least one converted ICN service flow.

12. The network device of claim 11, wherein the one or more ICN service flows comprise a service request, and wherein the at least one converted ICN service flow comprises returned data which has been generated by one or more service providers that provide one or more services in response to the service request.

13. The network device of claim 10, wherein the ICN service flow in the one or more ICN service flows is converted to a plurality of optical flows, wherein the ICN service flow comprises a service request for a service, and wherein the plurality of optical flows are transmitted, using at least a portion of the at least one optical resource, to a plurality of service providers that provide the service in response to the service request.

14. The network device of claim 10, wherein the at least one optical resource comprises at least one of bandwidth, wavelength, power, sub-wavelength, packet slot, and burst slot.

15. The network device of claim 10, wherein determining the at least one optical resource based on the one or more service labels comprises:
   mapping the one or more OILs to the at least one optical resource.

16. The network device of claim 10, wherein determining the at least one optical resource based on the one or more service labels comprises:
   sending, to a software defined network (SDN) controller in the optical network, a message indicating that the at least one optical resource needs to be provisioned to the one or more ICN service flows;
   receiving, from the SDN controller, the one or more OILs corresponding to the at least one optical resource; and
   mapping the one or more OILs to the at least one optical resource.

17. The network device of claim 10, wherein the at least one receiver is further configured to receive, from a generalized multi-protocol label switching (GMPLS) control plane, a data path through which an optical flow in the one or more optical flows travels en route to a destination of the optical flow, wherein the data path is determined by the GMPLS control plane taking into account global topology of the optical network, and wherein the optical flow is transmitted to a network node in the data path.

18. The network device of claim 10, wherein the at least one optical resource comprises an optical transmission parameter.

19. A computer program product comprising computer executable instructions stored on a non-transitory computer readable medium such that when executed by a processor cause an edge node to:
   receive one or more information centric networking (ICN) service flows from an ICN network, wherein each of the one or more ICN service flows is identifiable by a service label;
   determine a mapping between one or more of the service labels and at least one optical information label (OIL), wherein an OIL in the at least one OIL describes a mapping between a set of consumers and producers of one or more services in an ICN plane and resources in an optical plane;
   allocate a number of optical resources to the at least one OIL adaptively based on one or more service requirements set by the one or more service labels;
   convert one or more ICN service flows identified by the one or more service labels to at least one optical flow based on the determined mapping between the one or more service labels and the at least one OIL; and
   send the at least one optical flow onto at least one optical channel using the optical resources allocated to the at least one OIL.

20. The computer program product of claim 19, further comprising instructions that cause the edge node to:
   receive one or more incoming optical flows;
   determine a set of optical resources that have been provisioned to the one or more incoming optical flows;
   map the set of optical resources to at least one service label;
   convert the one or more incoming optical flows to at least one converted ICN service flow, each of which is identifiable by the at least one mapped service label; and
   transmit the at least one converted ICN service flow.

21. The computer program product of claim 20, wherein an ICN service flow in the one or more ICN service flows comprises a service interest from a service consumer, wherein the service interest requests one or more services which are available from a plurality of service providers, wherein the at least one optical flow comprises multiple optical flows which are converted from the ICN service flow, wherein the multiple optical flows are sent from the edge node and target the plurality of service providers as destinations, wherein the one or more incoming optical flows are received from the plurality of service providers and comprise returned data, wherein the returned data is generated by the plurality of service providers as a response to receiving the multiple optical flows, and wherein the at least one converted ICN service flow comprises a converted ICN service flow corresponding to the service interest, and wherein the converted ICN service flow comprises the returned data and was transmitted to the service consumer.

22. The computer program product of claim 20, wherein the one or more service requirements are associated with service names and contexts of the one or more services requested by the ICN service flows, and wherein the service requirements comprise one or more of quality of service (QoS), security requirement, and time sensitivity.

23. The computer program product of claim 19, wherein each of the optical resources comprises an optical transmission parameter.

* * * * *